United States Patent [19]

Putsch et al.

[11] Patent Number: 4,679,854

[45] Date of Patent: Jul. 14, 1987

[54] VEHICLE SEAT

[75] Inventors: Peter-Ulrich Putsch, Rockenhausen; Heinz P. Cremer, Kaiserslautern, both of Fed. Rep. of Germany

[73] Assignee: Keiper Recaro GmbH & Co., Fed. Rep. of Germany

[21] Appl. No.: 845,629

[22] Filed: Mar. 28, 1986

[30] Foreign Application Priority Data

Mar. 28, 1985 [DE] Fed. Rep. of Germany ....... 3511216

[51] Int. Cl.4 ............................................. B60R 21/00
[52] U.S. Cl. .................................... 297/486; 297/216; 297/464
[58] Field of Search ............... 297/464, 486, 468, 296, 297/473, 216, 445, 391, 411; 296/65 A; 248/429

[56] References Cited

U.S. PATENT DOCUMENTS

| 2,136,852 | 11/1938 | Knauth | 297/486 |
| 2,873,122 | 2/1959 | Peras | 297/486 X |
| 3,466,091 | 9/1969 | De Grusso | 297/486 |
| 3,627,379 | 12/1971 | Faust | 297/284 |
| 3,713,694 | 1/1973 | Miller | 397/486 |
| 3,901,550 | 8/1975 | Hamy | 297/486 |
| 3,922,030 | 11/1975 | Stedman | 297/468 |
| 4,145,083 | 3/1979 | Urban | 297/486 |

Primary Examiner—James T. McCall
Attorney, Agent, or Firm—Wigman & Cohen

[57] ABSTRACT

A vehicle seat having an upholstery support that supports the upholstery of the back rest has at least one arm provided on the upholstery support which extends over the shoulder of a seat user and restrains the user in the upward and outward directions during vehicle collision. A side restraint member is connected with the arm and configured so as to protect the user in a lateral direction without interfering with the freedom of movement of the user.

12 Claims, 4 Drawing Figures

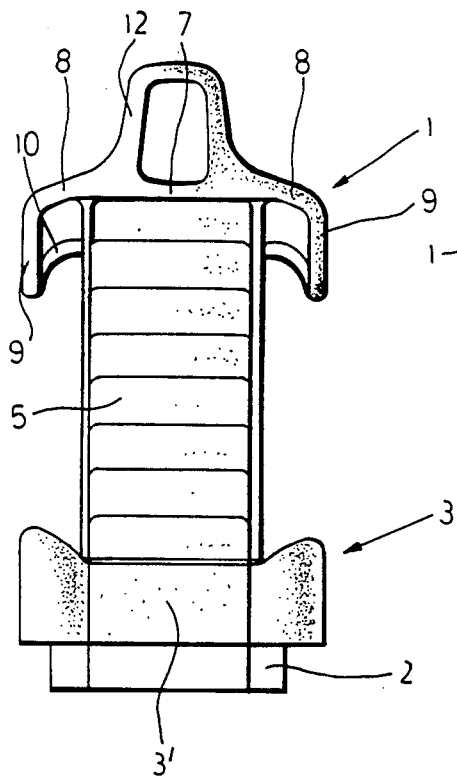
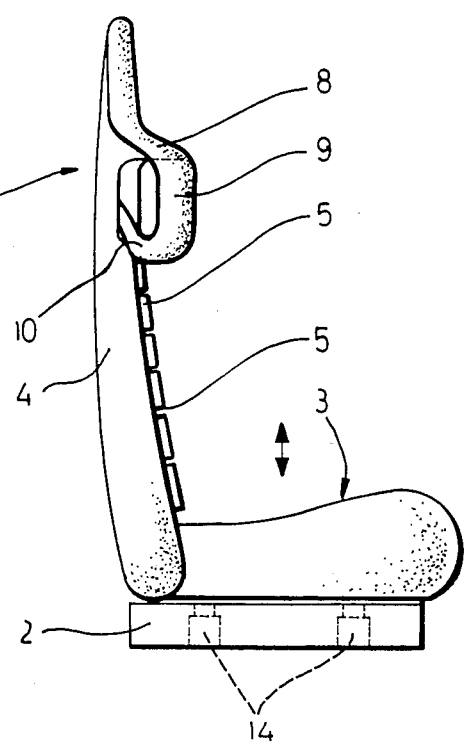
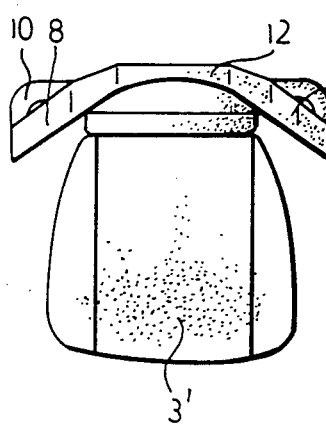
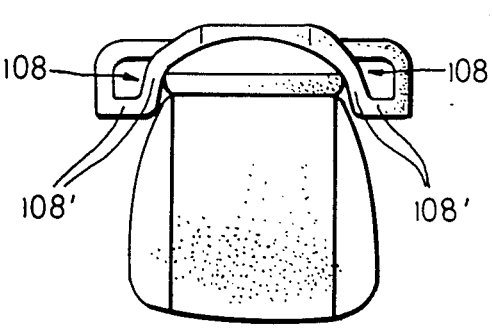

VEHICLE SEAT

BACKGROUND OF THE INVENTION

This invention relates to a vehicle seat having an upholstery support which supports the upholstery of the back rest.

In known vehicle seats, as used in motor vehicles, the forces in an accident that tend to throw the seat user out of the seat can only be absorbed by the safety belt. Known safety belts, such as the three-part belt system, have an inadequate restraining effect. Furthermore such belts are cumbersome and difficult to use, often restricting the freedom of movement of the user. Additional problems are encountered when another vehicle collides from the rear with the vehicle of the seat user. At best, side restraints may absorb a force component acting in the lateral direction of the seat. Therefore, in many accidents, the seat user cannot be held in contact with the seat.

SUMMARY AND OBJECT OF THE INVENTION

In view of the foregoing limitations and shortcomings of the prior art devices, as well as other disadvantages not specifically mentioned above, it should be apparent that there still exists a need in the art for a vehicle seat restraining system which protects the seat user without restricting the user's freedom of movement. It is, therefore, a primary object of this invention to create a vehicle seat which can contribute to holding the seat user in contact with the seat significantly better than the known vehicle seats.

Briefly described, the aforementioned object is accomplished according to the invention by providing an arm extending over the shoulder of the seat user from behind from a restraining system which primarily prevents the seat user from moving upward away from the seat, i.e., in the direction, in which the restraining effect of many safety belts, such as a three-point belt system, is insufficient. The solution according to the invention therefore substantially reduces the danger of serious injury in an accident. Extensions over both shoulders, for which purpose a second arm can be advantageous, increases the protective effect. Of course, the magnitude of the advantage of such a system relative to a system in which only one shoulder is overlapped, depends on the type of safety belt system. Obviously, the arms can be upholstered to a sufficient degree to achieve the desired protective effect.

In order to achieve a maximal protective function with seat users of different heights, the arm or arms can be connected with the other portions of the upholstery support in an adjustable manner. This adjustability can relate both to the extent to which the arm extends over the shoulder as well as the height adjustment of the arm or arms, i.e., the distance thereof above the surface of the seat portion. However, at least where the height of the center portion of the seat upholstery can be adjusted, in many cases a satisfactory protective function can be achieved even when each arm is connected with the upholstery support so as not to be height-adjusted therewith, because the adaptation to the shoulder height of the seat user can then take place by means of the height adjustment of the seat upholstery. In order to be able to adjust the degree of extension over the shoulder, the arm, or at least one of the two arms, can be connected with the upholstery support so as to be pivotable about an axis running at least approximately in the longitudinal direction of the back rest and/or so as to be adjustable in the lateral direction of the back rest. In addition, to ease entry and exit, it is advantageous to form at least the arm located on the door side in such a manner that it can be moved out of the way. This is particularly true if, as is the case in a preferred embodiment, the arms are joined to the respective side restraint elements which extend over the sides of the shoulders, and the arms can be joined thereto to form a single structural unit. The thus-achieved additional lateral support increases the protective function, because a lateral displacement of the upper body of the seat user is prevented. Furthermore, in this manner the protective function of the arms extending over the shoulders is maintained, while at the same time the neck of the seat user is reliably prevented from being pressed against one or the other of the arms. In addition, with a lateral support of the seat user provided in the shoulder area, the freedom of movement of the arms is inhibited much less than is the case with the side pieces extending over the sides of the hip area, which can be eliminated in the seat according to the invention. In order for the side restraint elements to be able to prevent lateral displacement for different seat users, it is advantageous to connect the side restraint elements with the upholstery support in an adjustable manner, i.e., pivotable and/or adjustable in the lateral direction of the seat. Instead of, or in addition to, the side restraints being adjustable in this manner, it is also possible to adapt to the shoulder width of the seat user with the aid of an upholstery element on the side facing the seat user, which has an effective strength or stiffness that can be varied by the use of inflatable elements. With a height-adjustable connection of the arms to the upholstery support, it is advantageous for the side restraints to also be capable of height adjustment.

For both technical as well as design reasons, in one preferred embodiment, the upper edge of the back rest, having an arm which is not height-adjustable, lies at shoulder level, so that the arm can be provided at the height of the upper edge of the back rest.

Each arm can be connected to respective sections of the side restraint elements running in the longitudinal direction of the back rest, which, in turn, are connected to a forwardly projecting shank of an L-like section, the other shank of which runs in the lateral direction of the back rest. This design of the arm and the side restraint elements of the upholstery support saves weight, but above all is also esthetically appealing, if the arms and the side restraint elements are open, rod-like elements provided with a surrounding upholstery. Above all, in connection with a head rest which is also formed of this type of rod-like, open element, both the arms and the side restraint elements blend harmoniously into the overall design of the back rest. In order not to limit the movement of the upper arms to the rear by the connecting sections of the side restraint elements running in the lateral direction of the seat, it is advantageous to arrange the section running in the lateral direction of the seat so that it is upwardly displaced relative to the lower end of the section of the side restraint elements acting to provide the lateral support, for example by having this section form an incline relative to the upholstery support of the back rest.

The invention is described in greater detail below with the aid of two exemplary embodiments illustrated in the drawings.

BRIEF DESCRIPTION OF THE DRAWINGS

FIG. 1 is a plan view of the first exemplary embodiment;

FIG. 2 is a side view of the first exemplary embodiment;

FIG. 3 is a top view of the first exemplary embodiment; and

FIG. 4 is a top view of a second exemplary embodiment according to FIG. 3.

DETAILED DESCRIPTION OF A PREFERRED EMBODIMENT

Referring now in detail to the drawings, there is illustrated in FIGS. 1 and 2 a motor vehicle seat back rest designated generally with the numeral 1, that is pivotable about a lateral axis and can be set in selectable inclined positions relative to the schematically illustrated seat frame 2 which supports seat upholstery, designated generally with the numeral 3, which includes a center portion 3', the height of which can be adjusted relative to the seat frame 2. Power operated adjusting devices 14, which are shown only schematically in FIG. 2, permit a separate or common height adjustment of the center portion 3' in the area of its front and rear ends, respectively. Of course, a manual height adjustment would also be possible, for example by means of receptacles for the upholstery support of the center portion 3' located at different heights. Because the back rest 1 is connected with the seat frame 2, the height adjustment of the center portion takes place relative to the back rest 1.

The back rest 1 includes an upholstery support designated generally with the numeral 4, and upholstery 5 lies thereon on the side facing the seat user.

The center portion of upholstery support 4 supporting the upholstery 5 ends approximately at shoulder level of the seat user. The upper edge of the upholstery support 4 forms an upholstered cross member 7, which, when viewed from the front, is curved in a concave manner, and the underside thereof lies approximately at the shoulder height of the seat user. Respective arms 8, which are also upholstered and rod-like in form, are rigidly connected at both ends of this cross member 7, and these arms 8, as shown in FIG. 3, run at an angle forward and to the side. These two arms 8 extend from behind over the shoulders of the seat user resting against the upholstery 5, whereby the overlap takes place at an adequately large distance from the neck of the seat user by means of their being directed at an angle forward and to the side.

An upholstered, rod-like side restraint member, comprising a vertical element 9 and an angular element 10 is formed in upholstery support 4. Vertical element 9 runs downward in the longitudinal direction of the back rest and is joined to the outer ends of each of arms 8. The lower end of this element 9 is joined to the front end of an angular element 10 of the side restraint member. As shown in FIG. 3, for example, the shank connected with the element 9 extends forward, while the other shank extends in the lateral direction of the seat, whereby both shanks are inclined toward the upholstery support 4, in order to limit the freedom of movement of the arms of the seat user as little as possible, which also simplifies the securing of the safety belt. The seat user is therefore supported in the shoulder area not only in an upward direction, by means of the two arms 8, but is also supported laterally by the two side restraint members, which are formed by the elements 9 and 10 and are formed as mirror images of each other with respect to the longitudinal center plane of the back rest. The upholstery of the cross member 7, the arms 8 and the side restraint members is formed to be full-length, and is fabricated, for example, of integral foam, so that an esthetically appealing design is produced.

At the point at which the two arms 8 merge with the cross members 7, they are joined with the downwardly directed shanks of a U-shaped frame 12, which is also upholstered similar to the cross members 7, the arms 8, and the side restraint members. This frame 12 forms a head rest that is integrated into the back rest design, whereby, because of the frame design and the flowing transition of the shanks of the frame into the arms 8, a harmonic and esthetically appealing incorporation of the head rest into the design of the back rest is accomplished. Of course, the back rest 1 could also be provided with a separate head rest of a common design. Because of the adaptation of the position of the seat user to the height of the arms 8 with the aid of the height adjustability of the center portion 3' of the seat upholstery, a height-adjustable design of the head rest can be eliminated. In addition, the lateral support of the seat user in the shoulder area by means of the side restraint members makes it possible to form the head rests more narrowly than common head rests, whereby the view from the back seats is much improved.

The exemplary embodiment illustrated in FIG. 4 differs from that described above only in that the arms 108 each have an end section 108' that extends forward and then is bent outward, whereby the extension over the shoulders of the seat user occurs in a broader zone and is therefore more effective. With regard to the further design of this exemplary embodiment, reference should be made to the description of the first exemplary embodiment.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A vehicle seat having a back rest including an upholstery support comprising two arms provided on said upholstery support and extending from said upholstery support so as to be positioned over the right and left shoulder, respectively of a vehicle seat user from behind the vehicle user when said user is seated in said vehicle seat wherein each of said arms is connected to a side restraint member that laterally overlaps the shoulder of the vehicle user, wherein each of said arms is formed together with the associated side restraint as a structural unit, and wherein said arms are positioned only above the shoulders of the vehicle user when said user is seated in said vehicle seat.

2. The vehicle seat of claim 1 wherein the side restraint member comprises an angular element extending in the lateral direction of the seat and connecting said side restraint member with said upholstery support, said angular element further comprising a lower edge which is upwardly displaced relative to the lower edge of said side restraint member.

3. The vehicle seat of claim 1 further comprising a seat portion connected with said upholstery support, wherein the arm is connected with the upholstery support so that the height of said arm is adjustable with respect to said seat portion.

4. A vehicle seat having a back rest including an upholstery support comprising at least one arm provided on said upholstery support and extending from said upholstery support so as to be positioned over one shoulder of a vehicle seat user when said user is seated in said vehicle seat, wherein the arm is rigidly connected with the upholstery support.

5. The vehicle seat of claim 1 further comprising a seat surface connected with said upholstery support and said seat surface having a center portion, wherein said center portion is capable of being adjusted relative to said upholstery support.

6. A vehicle seat having a back rest including an upholstery support comprising at least one arm provided on said upholstery support and extending from said upholstery support so as to be positioned over one shoulder of a vehicle seat user when said user is seated in said vehicle seat, further comprising a head rest connected with said arm, wherein the head rest is joined with said arm to form a single structural unit.

7. The vehicle seat of claim 1 wherein each of the arms extend forward of and to the side of the upholstery support at an angle with respect to the longitudinal axis of the upholstery support.

8. The vehicle seat of claim 1 wherein each of the arms has a section that extends forward of the upholstery support and a section that extends laterally of the upholstery support and is connected to said forwardly-extending section of the arms.

9. The vehicle seat of claim 1 wherein each arm has a rod-like shape.

10. The vehicle seat of claim 1 wherein the side restraint member and the arms have a rod-like shape.

11. The vehicle seat of claim 1 wherein the side restraint member and the arms are upholstered.

12. The vehicle seat of claim 1 wherein the side restraint member has a variable thickness.

* * * * *